United States Patent
Yamamoto et al.

(10) Patent No.: US 8,615,981 B2
(45) Date of Patent: Dec. 31, 2013

(54) INTEGRATED COAL GASIFICATION COMBINED CYCLE FACILITY

(75) Inventors: Takashi Yamamoto, Nagasaki (JP); Katsuhiro Ota, Tokyo (JP); Hiromi Ishii, Tokyo (JP); Yoshinori Koyama, Nagasaki (JP); Kimishiro Tokuda, Nagasaki (JP); Isao Mochida, Fukuoka (JP); Tatsuro Harada, Fukuoka (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 972 days.

(21) Appl. No.: 12/452,352

(22) PCT Filed: Nov. 6, 2008

(86) PCT No.: PCT/JP2008/070189
§ 371 (c)(1),
(2), (4) Date: Mar. 4, 2010

(87) PCT Pub. No.: WO2009/069443
PCT Pub. Date: Jun. 4, 2009

(65) Prior Publication Data
US 2010/0175364 A1 Jul. 15, 2010

(30) Foreign Application Priority Data
Nov. 30, 2007 (JP) .................. 2007-310564

(51) Int. Cl.
*F02C 6/00* (2006.01)
*F02G 1/00* (2006.01)

(52) U.S. Cl.
USPC ............... 60/39.182; 60/39.12; 60/39.464

(58) Field of Classification Search
USPC ........... 60/39.182, 39.464, 39.465, 781, 783, 60/39.12, 784; 122/7 R, 7 B
See application file for complete search history.

(56) References Cited

U.S. PATENT DOCUMENTS 4,594,140 A * 6/1986 Cheng ........................ 208/414
5,241,825 A * 9/1993 Collin et al. .................. 60/655

(Continued)

FOREIGN PATENT DOCUMENTS

JP  H04-337387     11/1992
JP  H04-353226 A   12/1992

(Continued)

OTHER PUBLICATIONS

IP Australia, "Notice of Acceptance for AU 2008330842", Nov. 8, 2012.

(Continued)

*Primary Examiner* — William H Rodriguez
(74) *Attorney, Agent, or Firm* — Manabu Kanesaka; Kenneth M. Berner; Benjamin J. Hauptman

(57) ABSTRACT

An integrated coal gasification combined cycle facility is provided that can prevent a reduction in power generation efficiency even when low-grade coal having a relatively-high moisture content is used. Included are: a gasification section that gasifies supplied coal; a gas power generation section that generates power by using gas supplied from the gasification section; a steam power generation section that generates power by using the heat of exhaust gas discharged from the gas power generation section; and a coal drying unit that dries the coal by using exhaust heat discharged from the steam power generation section and that supplies the dried coal to the gasification section.

8 Claims, 2 Drawing Sheets

(56) References Cited

U.S. PATENT DOCUMENTS

| | | | |
|---|---|---|---|
| 5,255,504 A * | 10/1993 | Hodrien et al. | 60/781 |
| 5,440,871 A * | 8/1995 | Dietz et al. | 60/781 |
| 5,695,532 A | 12/1997 | Johnson et al. | |
| 5,765,365 A * | 6/1998 | Fujioka et al. | 60/39.12 |
| 5,953,899 A * | 9/1999 | Rao et al. | 60/781 |
| 6,141,796 A | 11/2000 | Cummings | 60/39.12 |
| 2002/0095867 A1 | 7/2002 | Katayama | |
| 2004/0045272 A1 | 3/2004 | Miyoshi et al. | |
| 2008/0295480 A1* | 12/2008 | Hyakutake et al. | 60/39.12 |
| 2011/0139047 A1* | 6/2011 | Takase et al. | 110/218 |
| 2011/0308230 A1* | 12/2011 | Takase et al. | 60/39.182 |
| 2012/0006025 A1* | 1/2012 | Koyama et al. | 60/670 |
| 2012/0247080 A1* | 10/2012 | Ishii et al. | 60/39.12 |

FOREIGN PATENT DOCUMENTS

| | | |
|---|---|---|
| JP | H07-279621 A | 10/1995 |
| WO | 2006/042308 | 4/2006 |
| WO | WO 2006/044317 A2 | 4/2006 |

OTHER PUBLICATIONS

Korean Patent Office, Decision to Grant a Patent, Aug. 28, 2012.

\* cited by examiner

INTEGRATED COAL GASIFICATION COMBINED CYCLE FACILITY

TECHNICAL FIELD

The present invention relates to integrated coal gasification combined cycle facilities that are suitable for using, as fuel, low-grade coal such as brown coal and sub-bituminous coal, for example.

BACKGROUND ART

An integrated coal gasification combined cycle (hereinafter, referred to as "IGCC") is a power generation system aiming at higher efficiency and higher environmental performance than a conventional coal-fired power generation, by gasifying coal in combination with C/C (combined-cycle power generation).

Although the IGCC has a great advantage in its ability to use coal, which is an abundant resource, it is known that the advantage is further enhanced by expanding the types of coal to be used.

For example, the IGCC that employs a dry coal feed system can even use coal with a relatively high moisture content, but a high moisture content carried by low-grade coal such as brown coal and sub-bituminous coal causes a reduction in power generation efficiency.

In order to solve this problem, a technology for drying coal by using high-temperature gasified gas, a technology for pulverizing coal by using gas-turbine exhaust gas, and a technology for drying coal by using gas-turbine exhaust gas are known (for example, see Patent Citations 1 and 2).

Patent Citation 1:
Japanese Unexamined Patent Application, Publication No. 2002-155288
Patent Citation 2:
Japanese Translation of PCT International Application, Publication No. Hei-08-500850

DISCLOSURE OF INVENTION

However, the technologies described in Patent Citations 1 and 2 have a problem in that, because they use high-temperature gas, the exergy loss cannot be ignored and they contribute only slightly to efficiency improvement in a power generation system.

The present invention has been made to solve the above-mentioned problem, and an object thereof is to provide an integrated coal gasification combined cycle facility that can prevent a reduction in power generation efficiency even when low-grade coal having a relatively-high moisture content is used.

In order to achieve this object, the present invention provides the following solutions.

The present invention provides an integrated coal gasification combined cycle facility including a gasification section that gasifies supplied coal; a gas power generation section that generates electric power by using gas supplied from the gasification section; a steam power generation section that generates electric power by using heat of exhaust gas discharged from the gas power generation section; and a coal drying unit that dries the coal by using exhaust heat discharged from the steam power generation section and that supplies the dried coal to the gasification section.

According to the present invention, since the coal is dried by the coal drying unit before being supplied to the gasification section, even when low-grade coal, which is coal having a high moisture content, is used, it is possible to suppress the loss of heat energy caused by evaporation of the contained moisture or by heat removal occurring when steam flows out.

Further, since exhaust heat discharged from the steam power generation section is used to dry the coal, the heat-energy utilization efficiency can be increased. On the other hand, compared with a case where a heat generating unit that generates heat for drying coal is separately provided, it is unnecessary to supply new fuel or energy.

In the invention, it is desirable that: the steam power generation section include a condenser that recovers heat of steam discharged from the steam power generation section; and the coal drying unit dry the coal by using the heat recovered by the condenser.

By doing so, heat recovered by the condenser is used to dry the coal, and thus it is possible to dry the coal without bringing it in contact with steam, thus preventing the coal from absorbing the moisture in the steam.

In the invention, it is desirable to have a configuration in which: the steam power generation section includes a steam turbine unit to which steam generated with the heat of exhaust gas discharged from the gas power generation section is supplied; and the gasification section is supplied with steam extracted from the steam turbine unit as a gasifying agent for the coal.

By doing so, steam extracted from the steam turbine unit is used as a gasifying agent, and thus it is unnecessary to provide, for example, a booster compressor for increasing the pressure of a gasifying agent, a large-scale oxygen generating apparatus for generating a gasifying agent, or the like.

In the configuration, it is desirable that the gasification section is supplied with exhaust gas discharged from the gas power generation section as a heat source for heating.

By doing so, exhaust gas is guided to the gasification section, and the gasification section is heated by the heat of the exhaust gas. Therefore, it is unnecessary to separately supply fuel or energy in order to maintain the temperature of the gasification section.

In the invention, it is desirable that: the steam power generation section include a boiler that generates steam by using the heat of exhaust gas discharged from the gas power generation section; and the gasification section be supplied with the exhaust gas discharged from the boiler as a gasifying agent for the coal.

By doing so, exhaust gas that has been discharged from the gas turbine power generation section and that has been used to generate steam in the boiler is used as a gasifying agent, and thus it is unnecessary to provide, for example, a booster compressor for increasing the pressure of a gasifying agent, a large-scale oxygen generating apparatus for generating a gasifying agent, or the like.

Examples of the gas power generation section include a gas turbine power generation section that uses a gas turbine using, as fuel, gas supplied from the gasification section and a fuel cell power generation section that uses the gas as fuel.

In the invention, it is desirable that: the steam power generation section include a boiler that generates steam by using the heat of exhaust gas discharged from the gas power generation section; the gasification section be supplied with the exhaust gas discharged from the boiler as a gasifying agent for the coal; and the gasification section be supplied with the steam generated by the boiler as a gasifying agent for the coal.

By doing so, steam generated by the boiler is used as a gasifying agent, and thus it is unnecessary to separately provide, for example, a booster compressor for increasing the pressure of a gasifying agent, a large-scale oxygen generating apparatus for generating a gasifying agent, or the like.

Further, the generated steam is guided to the gasification section, and the gasification section is heated by the heat of the steam. Therefore, it is unnecessary to separately supply fuel or energy in order to maintain the temperature of the gasification section.

According to the integrated coal gasification combined cycle facility of the present invention, since coal is dried by the coal drying unit before being supplied to the gasification section, even when low-grade coal, which is coal having a high moisture content, is used, it is possible to suppress the loss of heat energy caused by evaporation of the contained moisture or by heat removal occurring when steam flows out. In other words, an advantage is afforded in that a reduction in power generation efficiency can be prevented even when low-grade coal having a relatively-high moisture content is used.

Figure 1:
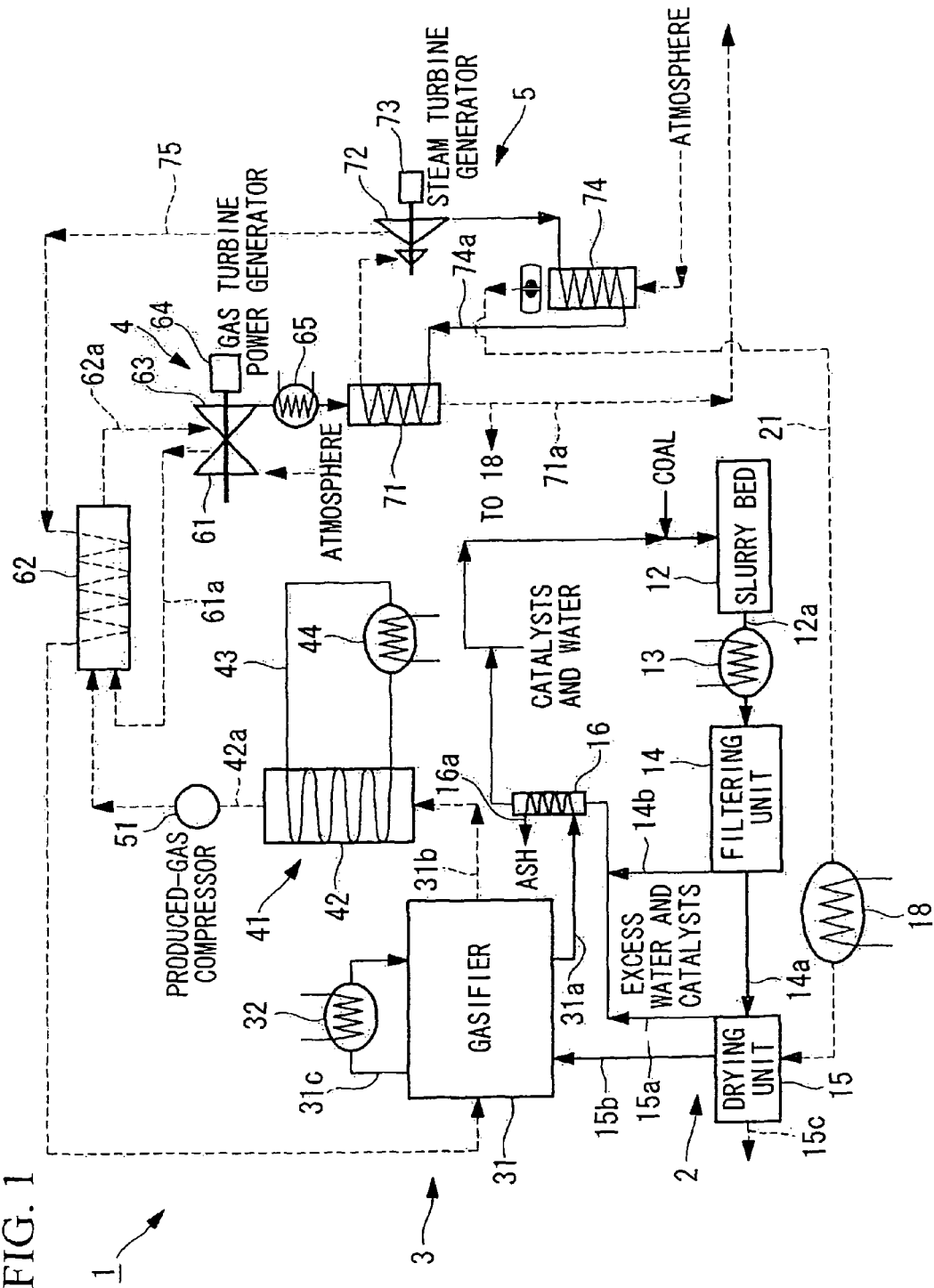
FIG. 1 is a schematic diagram for explaining the configuration of an integrated coal gasification combined cycle facility according to a first embodiment of the present invention.

EXPLANATION OF REFERENCE SIGNS 1, 101: integrated coal gasification combined cycle facility
3, 103: gasification section
4, 104: gas turbine power generation section (gas power generation section)
5, 105: steam power generation section
15: drying unit (coal drying unit)
72, 172: steam turbine (steam turbine unit)
74: condenser
12a: flow path through which slurry from slurry bed flows
14a: flow path for supplying dehydrated cake to drying unit
14b: flow path through which excess water and catalysts from filtering unit flows
15a: flow path through which excess water and catalysts from drying unit flows
15b: flow path for supplying coal to gasifier
15c: flow path through which drying air is discharged to the outside
16a: flow path through which ash from gasifier flows
31a: flow path through which ash from gasifier flows
31b: flow path through which produced gas from gasifier flows
31c: flow path through which gasifying agent etc. from gasifier flows
42a: flow path through which produced gas having passed through gas cleaning device flows
61a: flow path through which compressed air from compressor flows
62a: flow path through which combustion gas from combustor flows
71a: flow path through which exhaust gas having passed through boiler flows
74a: flow path through which condensed water in the condenser flows
131a: flow path through which ash from gasifier flows
131b: flow path through which produced gas from gasifier flows
131c: flow path for supplying part of exhaust gas from gas turbine power generation section into gasifier
142a: flow path through which produced gas having passed through gas cleaning device flows
162a: flow path through which combustion gas from combustor flows
171a: flow path through which exhaust gas having passed through boiler flows
174a: flow path through which condensed water in the condenser flows

BEST MODE FOR CARRYING OUT THE INVENTION

First Embodiment

An integrated coal gasification combined cycle facility according to a first embodiment of the present invention will be described below with reference to FIG. 1.

FIG. 1 is a schematic diagram for explaining the configuration of the integrated coal gasification combined cycle facility according to this embodiment.

An integrated coal gasification combined cycle facility 1 according to this embodiment generates power by using, as fuel, low-grade coal with a relatively high moisture content, such as brown coal and sub-bituminous coal.

As shown in FIG. 1, the integrated coal gasification combined cycle facility 1 includes a pretreatment section 2 that applies pretreatment and drying etc. to coal, a gasification section 3 that performs coal gasification, a gas turbine power generation section (gas power generation section) 4 that generates power by using gas supplied from the gasification section 3, and a steam power generation section 5 that generates power by using the heat of exhaust gas from the gas turbine power generation section 4.

The pretreatment section 2 applies pretreatment to coal, such as brown coal and sub-bituminous coal, supplied to the integrated coal gasification combined cycle facility 1 and supplies the pretreated coal to the gasification section 3. The pretreatment makes the coal suitable for a coal gasification reaction in the gasification section 3, and includes, for example, a treatment to pulverize the supplied coal and a treatment to mix catalysts that reduce the gasification reaction temperature.

The pretreatment section 2 includes a coal supplying unit (not shown) that supplies coal, such as brown coal, a slurry bed 12 that pulverizes the supplied coal and generates slurry, a slurry heat exchanger 13 that heats the slurry, a filtering unit 14 that eliminates excess water and catalysts contained in the slurry, a drying unit (coal drying unit) 15 that dries the pulverized coal, an ash heat exchanger 16 that heats excess water containing catalysts, a water and catalyst supplying unit (not shown) that supplies water containing catalysts, and a drying heat exchanger 18 that heats condenser exhaust to be supplied to the drying unit 15.

The coal supplying unit is a place where coal such as brown coal is supplied from the outside to the integrated coal gasification combined cycle facility 1.

The coal supplying unit is connected to a path disposed between the water and catalyst supplying unit and the slurry bed 12 so as to be able to supply coal to the slurry bed 12 together with the water containing catalysts.

The slurry bed 12 pulverizes the supplied coal to have a particle diameter suitable for the coal gasification in the gasification section 3 and generates slurry by using the water containing catalysts. The slurry generated in the slurry bed 12 contains approximately 90% water by weight. Further, it is desired that the diameter of the pulverized coal particles be approximately 1 mm or less in terms of acceleration of the coal gasification reaction in a gasifier 31.

The slurry bed 12 is connected to the slurry heat exchanger 13 and is configured such that the slurry generated in the slurry bed 12 can flow into the slurry heat exchanger 13. Note that a known configuration can be used for the slurry bed 12; the configuration thereof is not particularly limited.

The slurry heat exchanger 13 imparts heat recovered in a gas cleaning unit 41, to be described later, to the slurry generated in the slurry bed 12 so as to heat the slurry.

The slurry heat exchanger 13 is disposed between the slurry bed 12 and the filtering unit 14 and is configured such that the slurry can pass through the slurry heat exchanger 13. Further, the slurry heat exchanger 13 is configured such that a heating medium that conveys heat circulates between it and a heat-pipe heat exchanger 44 of the gas cleaning unit 41.

The filtering unit 14 eliminates excess water and catalysts from the slurry generated in the slurry bed 12 to produce a dehydrated cake in which the amount of moisture contained in the pulverized coal is reduced. The dehydrated cake contains approximately 70% water by weight.

The filtering unit 14 is disposed between the slurry heat exchanger 13 and the drying unit 15 and is configured such that the slurry flows into the filtering unit 14 and the dehydrated cake is supplied from the filtering unit 14 to the drying unit 15. On the other hand, the filtering unit 14 is configured such that the excess water containing catalysts eliminated by the filtering unit 14 flows into the ash heat exchanger 16.

Note that an example of the filtering unit 14 is a vacuum hydro-extractor or the like; the filtering unit 14 is not particularly limited.

The drying unit 15 further eliminates water contained in the dehydrated cake produced in the filtering unit 14 to dry the dehydrated cake. The pulverized coal dried in the drying unit 15 contains approximately 20% to approximately 30% water by weight.

The drying unit 15 is disposed between the filtering unit 14 and the gasification section 3 and is configured such that the dehydrated cake produced in the filtering unit 14 is supplied to the drying unit 15 and the pulverized coal dried in the drying unit 15 is supplied to the gasifier 31 of the gasification section 3.

On the other hand, the drying unit 15 is connected to a drying flow path 21 that supplies drying air (condenser exhaust) discharged from a condenser 74, to be described later, to the drying unit 15. The drying unit 15 is configured so as to be able to dry the dehydrated cake by eliminating moisture therefrom, using the drying air supplied through the drying flow path 21.

Further, the drying unit 15 is configured such that water containing catalysts recovered by the drying unit 15 flows into the ash heat exchanger 16.

Note that a known configuration can be used for the drying unit 15; the configuration thereof is not particularly limited.

The drying flow path 21 is provided with the drying heat exchanger 18, which heats drying air. The drying heat exchanger 18 is configured such that the drying air can pass therethrough and is supplied with part of exhaust gas from a turbine 63 that is discharged from a boiler 71.

The ash heat exchanger 16 heats the excess water containing catalysts recovered by the filtering unit 14 and the drying unit 15.

The ash heat exchanger 16 is disposed between the water and catalyst supplying unit and both the filtering unit 14 and the drying unit 15 and is configured such that the excess water containing catalysts recovered by the filtering unit 14 and the drying unit 15 passes through the ash heat exchanger 16. On the other hand, the ash heat exchanger 16 is supplied with ash discharged from the gasifier 31 and is configured such that heat can be exchanged between the ash and the excess water containing catalysts.

Note that a known configuration can be used for the ash heat exchanger 16; the configuration thereof is not particularly limited.

The water and catalyst supplying unit supplies water containing catalysts to compensate for the deficit in catalysts and water supplied to the gasifier 31 together with the pulverized coal.

The water and catalyst supplying unit is disposed between the ash heat exchanger 16 and the slurry bed 12 to supply water containing catalysts to the excess water containing catalysts flowing out from the ash heat exchanger 16.

Here, catalysts that accelerate the coal gasification reaction at a temperature lower than approximately 1,000° C. are used. Specifically, catalysts that contain alkaline earths, alkali metals, etc. are used, for example.

The gasification section 3 applies a gasification treatment to the coal supplied from the pretreatment section 2 and supplies produced gas to the gas turbine power generation section 4.

The gasification section 3 includes the gasifier 31, in which coal gasification is performed, and an external heat exchanger 32 that supplies heat to the interior of the gasifier 31.

The gasifier 31 produces combustible gas from the coal through a gasification reaction and supplies the produced gas to the gas turbine power generation section 4.

In the gasifier 31, the pressure is set to standard pressure, and the temperature is set to approximately 1,000° C. or lower, and more preferably falls within the range from approximately 600° C. to approximately 700° C.; the coal gasification through the gasification reaction is performed under such conditions.

The gasifier 31 is configured to be supplied with the pulverized coal from the drying unit 15 and to be supplied with steam serving as a gasifying agent from the steam power generation section 5. On the other hand, the gasifier 31 discharges ash to the ash heat exchanger 16 and also supplies the produced gas to the gas turbine power generation section 4.

The ash discharged from the gasifier 31 is generated from the coal through the gasification reaction.

Note that any furnace having a known structure, such as an entrained bed or a fluidized bed, can be used as the gasifier 31; the structure thereof is not particularly limited.

The external heat exchanger 32 supplies heat to the gasifier 31, in which the gasification reaction, which is an endothermic reaction, is performed.

The external heat exchanger 32 is configured such that a gasifying agent etc. in the gasifier 31 can pass therethrough and is also configured such that a heating medium that conveys heat circulates between it and a gas-turbine heat exchanger 65. In other words, the external heat exchanger 32 is configured such that heat conveyed from the gas-turbine heat exchanger 65 is imparted to the gasifying agent etc. passing through the external heat exchanger 32.

The gas cleaning unit 41 and a produced-gas compressor 51 are provided between the gasification section 3 and the gas turbine power generation section 4.

The gas cleaning unit 41 eliminates impurities etc. contained in the produced gas produced by the gasifier 31 and also recovers part of the heat of the produced gas.

The gas cleaning unit 41 includes a cleaning device 42 that cleans the produced gas, a heat pipe 43 that recovers part of the heat of the produced gas, and the heat-pipe heat exchanger 44 that transfers the heat recovered by the heat pipe 43 to the slurry heat exchanger 13.

The cleaning device 42 eliminates impurities etc. contained in the produced gas passing therethrough.

The cleaning device 42 is disposed between the gasifier 31 and the produced-gas compressor 51 and is configured such that the produced gas passes therethrough. Further, the heat pipe 43 is disposed on a wall surface etc. of the cleaning device 42 and is configured such that the heat of the produced gas is transferred to the heat pipe 43.

Note that a known configuration can be used for the cleaning device 42; the configuration thereof is not particularly limited.

The heat pipe 43 transfers part of the heat of the produced gas passing through the cleaning device 42 to the heat-pipe heat exchanger 44.

The heat pipe 43 is disposed around the cleaning device 42 and is also disposed so as to be able to exchange heat with the heat-pipe heat exchanger 44.

A known configuration can be used for the heat pipe 43; the configuration thereof is not particularly limited.

The heat-pipe heat exchanger 44 transfers part of the heat of the produced gas recovered by the heat pipe 43 to the slurry heat exchanger 13.

The heat-pipe heat exchanger 44 is provided with the heat pipe 43 and is configured such that a heating medium that conveys heat circulates between the heat-pipe heat exchanger 44 and the slurry heat exchanger 13.

The produced-gas compressor 51 increases the pressure of the produced gas produced in the gasifier 31 and supplies the produced gas whose pressure has been increased to a combustor 62 of the gas turbine power generation section 4.

The produced-gas compressor 51 is disposed between the gas cleaning unit 41 and the combustor 62 and is configured to take in the produced gas cleaned by the gas cleaning unit 41 and to discharge the produced gas whose pressure has been increased toward the combustor 62.

A known configuration can be used for the produced-gas compressor 51; the configuration thereof is not particularly limited.

The gas turbine power generation section 4 generates power by combusting the produced gas produced by the gasification section 3.

The gas turbine power generation section 4 includes a compressor 61 that takes in and compresses air, the combustor 62 that combusts the produced gas, the turbine 63 that generates a rotary driving force, and a gas turbine generator 64 that generates power.

The compressor 61 is rotationally driven by the turbine 63 to take in air from atmosphere and compress the air, and then supplies the compressed air to the combustor 62.

The compressor 61 is disposed concentrically with the turbine 63 such that a rotary driving force generated in the turbine 63 is transferred thereto.

A known configuration can be used for the compressor 61; the configuration thereof is not particularly limited.

The combustor 62 combusts the produced gas supplied from the gasification section 3 and also heats extracted steam to be supplied to the gasifier 31.

The combustor 62 is configured to be supplied with the compressed air from the compressor 61 and to be supplied with the produced gas from the gasification section 3. Further, the combustor 62 is configured to supply the turbine 63 with combustion gas generated by combusting the produced gas in the combustor 62.

On the other hand, a gasifying-agent flow path 75 through which extracted steam extracted from the steam power generation section 5 and supplied to the gasifier 31 flows is disposed around the combustor 62. With the gasifying-agent flow path 75 disposed in this way, the extracted steam to be supplied to the gasifier 31 is heated by the combustion heat of the produced gas in the combustor 62.

The turbine 63 generates a rotary driving force by using the combustion gas supplied from the combustor 62 to rotationally drive the compressor 61 and the gas turbine power generation section 4. The turbine 63 is disposed concentrically with the compressor 61 so as to transfer the rotary driving force to the compressor 61 and the gas turbine power generation section 4.

Further, the turbine 63 is configured such that exhaust gas discharged from the turbine 63 is supplied to the gas-turbine heat exchanger 65.

A known configuration can be used for the turbine 63; the configuration thereof is not particularly limited.

The gas turbine generator 64 is rotated by the rotary driving force generated by the turbine 63, to generate power. The gas turbine generator 64 is configured such that the rotary driving force is transferred from the turbine 63.

A known configuration can be used for the gas turbine generator 64; the configuration thereof is not particularly limited.

The gas-turbine heat exchanger 65 is provided between the gas turbine power generation section 4 and the steam power generation section 5.

The gas-turbine heat exchanger 65 recovers part of the heat of the exhaust gas discharged from the turbine 63 and supplies it to the external heat exchanger 32.

The gas-turbine heat exchanger 65 is disposed between the turbine 63 and the boiler 71 and is configured such that exhaust gas passes therethrough. Further, the gas-turbine heat exchanger 65 is configured such that a heating medium that conveys heat circulates between it and the external heat exchanger 32.

The steam power generation section 5 generates power by using the heat of the exhaust gas discharged from the gas turbine power generation section 4.

The steam power generation section 5 includes the boiler 71 that generates steam, a steam turbine (steam turbine unit) 72 that generates a rotary driving force from the steam, a steam turbine generator 73 that generates power, and the condenser 74 that recovers part of the heat of the steam discharged from the steam turbine 72.

The boiler 71 generates steam by using the heat of the exhaust gas from the gas turbine power generation section 4.

The boiler 71 is disposed downstream of the gas-turbine heat exchanger 65 and is configured such that the exhaust gas from the gas turbine power generation section 4 passes therethrough. On the other hand, the boiler 71 is configured such that water condensed by the condenser 74 flows into the boiler 71. In other words, the boiler 71 is configured such that heat is exchanged between the exhaust gas and the condensed water, so as to generate steam.

On the other hand, part of the exhaust gas passing through the boiler 71 is guided to the drying heat exchanger 18 and is used to heat drying air, and the remaining exhaust gas is discharged as exhaust smoke.

The steam turbine 72 generates a rotary driving force from the steam supplied from the boiler 71.

The steam turbine 72 is disposed between the boiler 71 and the condenser 74 and is configured such that steam from the boiler 71 flows into the steam turbine 72 and steam discharged from the steam turbine 72 flows into the condenser 74.

A known configuration can be used for the steam turbine 72; the configuration thereof is not particularly limited.

On the other hand, the steam turbine 72 is connected to the gasifying-agent flow path 75 that extracts part of the steam supplied to the steam turbine 72 and that guides it to the gasifier 31 as a gasifying agent.

The gasifying-agent flow path 75 connects the steam turbine 72 and the gasifier 31 and is disposed so as to be able to exchange heat with the combustor 62. In other words, the gasifying-agent flow path 75 is configured such that steam flowing through the gasifying-agent flow path 75 is heated by the combustion heat in the combustor 62.

The steam turbine generator 73 generates power by using the rotary driving force generated in the steam turbine 72. The steam turbine generator 73 is configured such that the rotary driving force is transferred from the steam turbine 72.

A known configuration can be used for the steam turbine generator 73; the configuration thereof is not particularly limited.

The condenser 74 condenses the steam discharged from the steam turbine 72 and also recovers part of the heat of the steam.

The condenser 74 is disposed between the steam turbine 72 and the boiler 71 and is configured such that steam from the steam turbine 72 flows into the condenser 74 and water condensed in the condenser 74 flows into the boiler 71. On the other hand, the condenser 74 is configured such that drying air introduced from the atmosphere passes through the condenser 74 to flow into the drying flow path 21.

Next, a power generation method used in the integrated coal gasification combined cycle facility 1, having the above-described configuration, will be described with reference to FIG. 1.

Coal supplied to the coal supplying unit is supplied to the slurry bed 12 together with water containing catalysts supplied from the water and catalyst supplying unit etc. In the slurry bed 12, the supplied coal is pulverized to fine coal particles to generate slurry. At this time, it is preferable that the diameter of the coal particles be approximately 1 mm or less. The slurry generated by the slurry bed 12 contains approximately 90% water by weight and has a temperature from approximately 100° C. to approximately 200° C.

The slurry flows into the slurry heat exchanger 13 from the slurry bed 12 and is heated by heat supplied from the heat-pipe heat exchanger 44 of the gas cleaning unit 41. The heated slurry is supplied from the slurry heat exchanger 13 to the filtering unit 14.

The filtering unit 14 eliminates excess water and catalysts contained in the supplied slurry and produces a dehydrated cake. The dehydrated cake produced by the filtering unit 14 contains approximately 70% water by weight. On the other hand, the eliminated excess water and catalysts are supplied to the ash heat exchanger 16.

The dehydrated cake is supplied from the filtering unit 14 to the drying unit 15, is dried by drying air supplied through the drying flow path 21, and is supplied to the gasifier 31. The dried pulverized coal contains approximately 20% to approximately 30% water by weight.

On the other hand, the drying air is introduced from the atmosphere, is heated to approximately 80° C. by the heat of steam in the condenser 74, is further heated by the heat of exhaust gas in the drying heat exchanger 18, and is supplied to the drying unit 15. The drying air used to extract moisture from the dehydrated cake in the drying unit 15 is discharged to the outside.

Excess water and catalysts separated from the dehydrated cake in the drying unit 15 are supplied to the ash heat exchanger 16 together with the excess water and catalysts separated in the filtering unit 14.

The water containing catalysts supplied to the ash heat exchanger 16 is heated in the ash heat exchanger 16 by the heat of ash discharged from the gasifier 31. The heated water containing catalysts flows toward the slurry bed 12, new water containing catalysts is added thereto from the water and catalyst supplying unit, coal is supplied thereto from the coal supplying unit, and then the fluid flows into the slurry bed 12 again.

The gasifier 31 is supplied with the pulverized coal from the drying unit 15 and is also supplied with a gasifying agent, namely, steam extracted from the steam turbine 72. Further, the gasifier 31 is supplied with the heat of exhaust gas via the external heat exchanger 32, to be kept at a temperature from approximately 600° C. to approximately 700° C., for example.

The interior of the gasifier 31 is kept at standard pressure, and combustible gas is produced therein through the coal gasification reaction. The produced gas is supplied from the gasifier 31 to the gas cleaning unit 41. Since the coal contains catalysts, the coal gasification reaction proceeds to produce combustible gas even at a temperature from approximately 600° C. to approximately 700° C., for example.

In this way, when the coal gasification reaction is performed by using catalysts at a temperature lower than approximately 1,000° C., the exergy (effective energy) loss can be suppressed, compared with a case where the gasification reaction is performed at a higher temperature. In other words, power generation can be performed with high efficiency.

The steam, serving as a gasifying agent, to be supplied to the gasifier 31 is heated while flowing through the gasifying-agent flow path 75 from the steam turbine 72 toward the gasifier 31, by receiving the supply of combustion heat in the combustor 62. Specifically, steam having a temperature lower than approximately 150° C., for example, when extracted from the steam turbine 72 is heated, by receiving the combustion heat, to a temperature of approximately 700° C., for example.

More preferably, the steam is heated to a temperature several tens of degrees Celsius higher than the gasification reaction temperature in the gasifier 31.

Further, a position where steam is extracted from the steam turbine 72 is selected, thereby supplying the gasifier 31 with steam having a pressure close to that in the gasifier 31.

On the other hand, after the coal discharges combustible produced gas, ash is generated and is supplied to the ash heat exchanger 16. Note that a known reaction can be used as the coal gasification reaction; the coal gasification reaction is not particularly limited.

The produced gas produced by the gasifier 31 flows into the cleaning device 42 of the gas cleaning unit 41, where impurities are eliminated therefrom, and part of the heat of the produced gas is recovered by the heat pipe 43.

The temperature of the produced gas flowing out from the gasifier 31 is lower than approximately 500° C., for example, and is reduced to be lower than approximately 300° C., for example, by recovering part of the heat of the produced gas in the gas cleaning unit 41.

The heat pipe 43 of the gas cleaning unit 41 recovers part of the heat of the produced gas and supplies the recovered heat to the slurry heat exchanger 13 via the heat-pipe heat exchanger 44.

The produced gas from which impurities have been eliminated flows into the produced-gas compressor 51, is increased in pressure, and is then supplied to the combustor 62. The produced gas whose pressure has been increased has a pressure of approximately 1.5 MPa, for example.

The combustor 62 is supplied with the produced gas whose pressure has been increased and air compressed by the compressor 61 and combusts the produced gas. The compressed air has a temperature lower than approximately 300° C., for example.

Part of the heat generated through combustion of the produced gas is used to increase the temperature of steam flowing through the gasifying-agent flow path 75, and the remaining heat flows into the turbine 63 together with combustor exhaust gas. In other words, combustor exhaust gas whose temperature has become high is supplied to the turbine 63. The temperature of the combustor exhaust gas is approximately 1,000° C. or higher, and more desirably falls within the range from 1,200° C. to 1,500° C., for example.

In the turbine 63, a rotary driving force is retrieved from the high-temperature combustor exhaust gas and the rotary driving force is transferred to the compressor 61 and the gas turbine generator 64. In other words, the turbine 63 is supplied with the high-temperature combustor exhaust gas to rotationally drive the compressor 61 and the gas turbine generator 64.

Being rotationally driven, the gas turbine generator 64 generates power, and the compressor 61 compresses air introduced from the atmosphere and supplies the compressed air to the combustor 62.

The exhaust gas used to rotationally drive the turbine 63 flows into the gas-turbine heat exchanger 65 from the turbine 63 and, after part of the heat thereof is recovered, flows into the boiler 71. The exhaust gas flowing into the boiler 71 has a temperature lower than approximately 600° C., for example.

The heat recovered by the gas-turbine heat exchanger 65 is supplied to the gasifier 31 via the external heat exchanger 32.

The boiler 71 supplies part of the heat of the exhaust gas flowing thereto to the water supplied from the condenser 74, to generate steam. The steam generated in the boiler 71 is supplied to the steam turbine 72 to rotationally drive the steam turbine 72.

A rotary driving force retrieved in the steam turbine 72 is transferred to the steam turbine generator 73 and is used for power generation.

Part of the steam supplied to the steam turbine 72 is extracted from the steam turbine 72 and is supplied to the gasifier 31 through the gasifying-agent flow path 75. On the other hand, most of the steam supplied to the steam turbine 72 flows into the condenser 74 and is condensed in the condenser 74.

The condenser 74 is supplied with the steam discharged from the steam turbine 72 and drying air introduced from the atmosphere. In the condenser 74, the heat of the discharged steam is absorbed by the drying air, and the discharged steam is condensed. The condensed water is supplied to the boiler 71 again to become steam.

On the other hand, the drying air that has increased its temperature by absorbing the heat of the discharged steam flows into the drying flow path 21 and flows toward the drying unit 15.

Part of exhaust gas flowing out from the condenser 74 is supplied to the drying heat exchanger 18 and is used to increase the temperature of the drying air. On the other hand, most of the exhaust gas is discharged as exhaust smoke. The discharged exhaust gas has a temperature falling within the range from approximately 80° C. to approximately 150° C., for example.

According to the above-described configuration, since the coal is dried by the drying unit 15 before being supplied to the gasification section 3, even when low-grade coal, which is coal having a high moisture content, is used, it is possible to suppress the loss of heat energy caused by evaporation of the contained moisture or by heat removal occurring when steam flows out, thus preventing a reduction in power generation efficiency.

Further, since exhaust heat discharged from the steam power generation section 5 is used to dry coal in the condenser 74, the heat-energy utilization efficiency can be increased. On the other hand, compared with a case where a heat generating unit that generates heat for drying coal is separately provided, it is unnecessary to supply new fuel or energy, and thus, a reduction in power generation efficiency can be prevented.

Heat recovered by the condenser 74 of the steam power generation section 5 is used to dry coal, thereby making it possible to dry the coal without bringing it in contact with steam, to prevent the coal from absorbing the moisture in the steam and to prevent a reduction in power generation efficiency.

Since steam extracted from the steam turbine 72 is used as a gasifying agent, it is unnecessary to provide, for example, a booster compressor for increasing the pressure of a gasifying agent, a large-scale oxygen generating apparatus for generating a gasifying agent, or the like.

Exhaust gas from the gas turbine power generation section 4 is guided to the gasification section 3, and the gasifier 31 is heated by the heat of the exhaust gas. Therefore, it is unnecessary to separately supply fuel or energy in order to maintain the temperature inside the gasifier 31, and thus, a reduction in power generation efficiency can be prevented.

Note that although the example case where drying air to be supplied to the condenser 74 is introduced from the atmosphere has been described in the above embodiment, compressed air extracted from the compressor 61 may be used as the drying air; the drying air is not particularly limited.

When compressed air extracted from the compressor 61 is used as the drying air, more dried air can be used as the drying air, and thus, drying can be performed more effectively in the drying unit 15, compared with the method of introducing drying air from the atmosphere.

Note that although the example case where the produced gas produced in the gasification section 3 is supplied to the gas turbine power generation section 4 as fuel for power generation has been described in the above embodiment, fuel cells that use the produced gas as fuel may be used for power generation; the way the produced gas is used is not particularly limited.

Second Embodiment

Next, an integrated coal gasification combined cycle facility according to a second embodiment of the present invention will be described with reference to FIG. 2.

Figure 2:
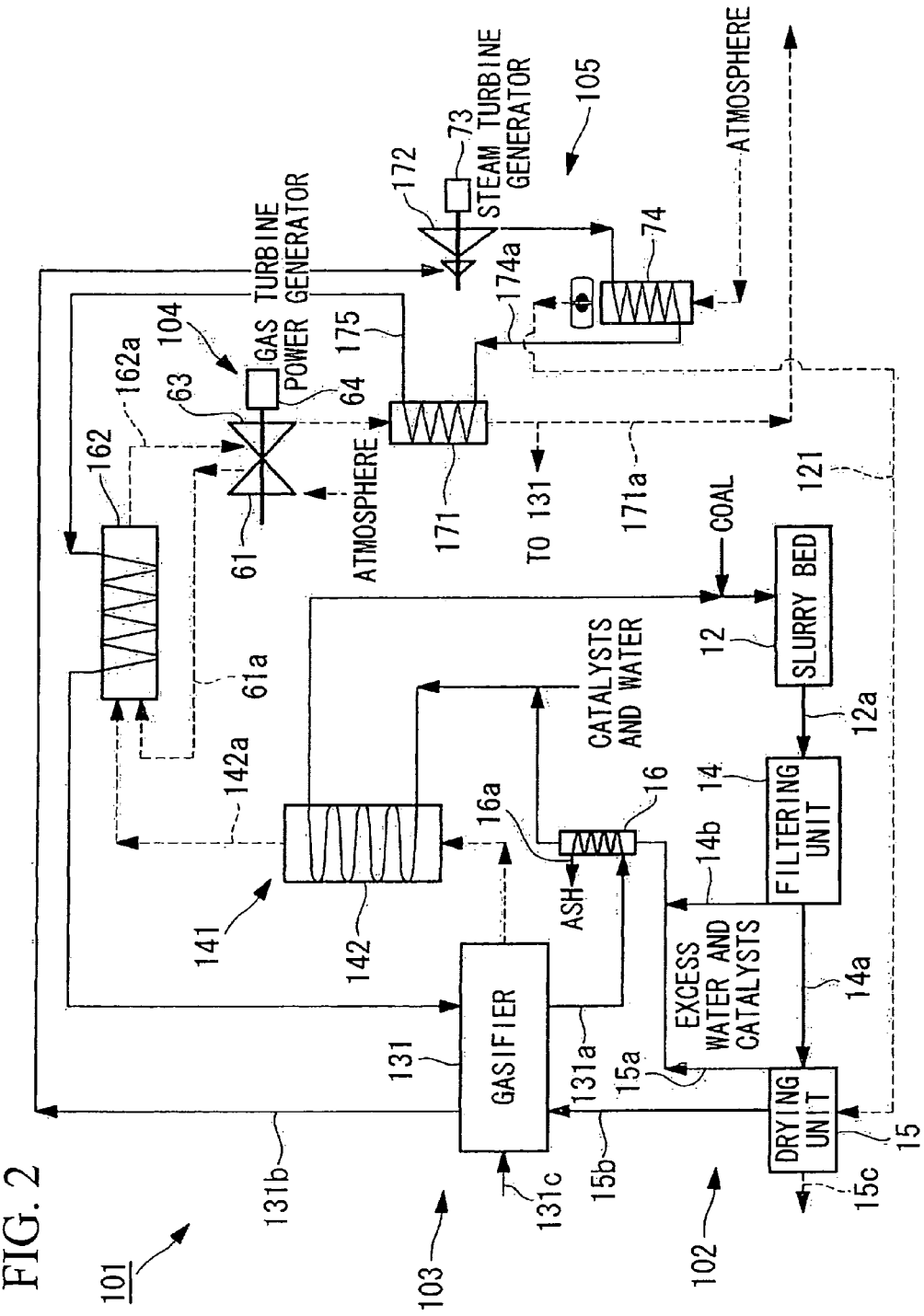
FIG. 2 is a schematic diagram for explaining the configuration of an integrated coal gasification combined cycle facility according to a second embodiment of the present invention.

FIG. 2 is a schematic diagram for explaining the configuration of the integrated coal gasification combined cycle facility according to this embodiment.

Note that identical reference numerals are assigned to the same components as those of the first embodiment, and a description thereof will be omitted.

An integrated coal gasification combined cycle facility 101 according to this embodiment differs considerably from the integrated coal gasification combined cycle facility 1 of the first embodiment in that the gasification section 3 is a pressurization system and a different circuit configuration is also used. Therefore, differences from the integrated coal gasification combined cycle facility 1 of the first embodiment will be described below.

As shown in FIG. 2, the integrated coal gasification combined cycle facility 101 includes a pretreatment section 102 that applies pretreatment and drying etc. to coal, a gasification section 103 that performs coal gasification, a gas turbine power generation section (gas power generation section) 104 that generates power by using gas supplied from the gasification section 103, and a steam power generation section 105 that generates power by using the heat of exhaust gas from the gas turbine power generation section 104.

The pretreatment section 102 applies pretreatment to coal, such as brown coal and sub-bituminous coal, supplied to the integrated coal gasification combined cycle facility 101 and supplies the pretreated coal to the gasification section 103.

The pretreatment section 102 includes a coal supplying unit (not shown) that supplies coal such as brown coal, the slurry bed 12 that pulverize the supplied coal and generates slurry, the filtering unit 14 that eliminates excess water and catalysts contained in the slurry, the drying unit 15 that dries the pulverized coal, the ash heat exchanger 16 that heats excess water containing catalysts, and a water and catalyst supplying unit that supplies water containing catalysts.

On the other hand, the drying unit 15 is connected to a drying flow path 121 that supplies drying air (condenser exhaust) discharged from the condenser 74, to be described later, to the drying unit 15. The drying unit 15 is configured so as to be able to dry a dehydrated cake by eliminating moisture therefrom, using the drying air supplied through the drying flow path 121.

The gasification section 103 applies a gasification treatment to the coal supplied from the pretreatment section 102 and supplies produced gas to the gas turbine power generation section 104.

The gasification section 103 includes a gasifier 131 that performs coal gasification, and the gasifier 131 supplies the produced gas to the gas turbine power generation section 104.

The interior of the gasifier 131 is pressurized at a predetermined pressure, and the temperature thereof is set to approximately 1,000° C. or lower, and more preferably falls within the range from approximately 600° C. to approximately 700° C.; the coal gasification through the gasification reaction is performed under such conditions.

The gasifier 131 is supplied with the pulverized coal from the drying unit 15, part of exhaust gas from the gas turbine power generation section 104 as a gasifying agent, and steam generated in a boiler 171. On the other hand, the gasifier 131 discharges ash to the ash heat exchanger 16, supplies the produced gas to the gas turbine power generation section 104, and further supplies steam to a steam turbine 172.

Note that any furnace having a known structure, such as an entrained bed or a fluidized bed, can be used as the gasifier 131; the structure thereof is not particularly limited.

A gas cleaning unit 141 is provided between the gasification section 103 and the gas turbine power generation section 104. The gas cleaning unit 141 eliminates impurities etc. contained in the produced gas produced by the gasifier 131 and also recovers part of the heat of the produced gas.

In the gas cleaning unit 141, a cleaning device 142 that cleans the produced gas is disposed between the gasifier 131 and a combustor 162.

The cleaning device 142 is configured such that the produced gas passes therethrough and is further configured such that heat is exchanged between the water containing catalysts to be supplied to the slurry bed 12 and the produced gas. In other words, the cleaning device 142 is configured so as to heat the water containing catalysts.

Note that a known configuration can be used for the cleaning device 142; the configuration thereof is not particularly limited.

The gas turbine power generation section 104 generates power by combusting the produced gas produced by the gasification section 103.

The gas turbine power generation section 104 includes the compressor 61 that takes in and compresses air, the combustor 162 that combusts the produced gas, the turbine 63 that generates a rotary driving force, and the gas turbine generator 64 that generates power.

The combustor 162 combusts the produced gas supplied from the gasification section 103 and also heats steam to be supplied to the gasifier 131.

The combustor 162 is configured to be supplied with the compressed air from the compressor 61 and to be supplied with the produced gas from the gasification section 103. Further, the combustor 162 is configured to supply the turbine 63 with combustion gas generated by combusting the produced gas in the combustor 162.

On the other hand, a gasifying-agent flow path 175 through which steam supplied from the boiler 171 to the gasifier 131 flows is disposed around the combustor 162. With the gasifying-agent flow path 175 disposed in this way, the steam to be supplied to the gasifier 131 is heated by the combustion heat of the produced gas in the combustor 162.

The steam power generation section 105 generates power by using the heat of exhaust gas discharged from the gas turbine power generation section 104.

The steam power generation section 105 includes the boiler 171 that generates steam, the steam turbine (steam turbine unit) 172 that generates a rotary driving force from the steam, the steam turbine generator 73 that generates power, and the condenser 74 that recovers part of the heat of the steam discharged from the steam turbine 172.

The boiler 171 generates steam by using the heat of exhaust gas from the gas turbine power generation section 104.

The boiler 171 is disposed downstream of the turbine 63 and is configured such that the exhaust gas from the gas turbine power generation section 104 passes therethrough. On the other hand, the boiler 171 is configured such that water condensed by the condenser 74 flows into the boiler 171. In other words, the boiler 171 is configured such that heat is exchanged between the exhaust gas and the condensed water, so as to generate steam.

On the other hand, part of the exhaust gas passing through the boiler 171 is guided to the gasifier 131 and is used as a gasifying agent, and the remaining exhaust gas is discharged as exhaust smoke.

The steam turbine 172 generates a rotary driving force from the steam supplied from the boiler 171 via the gasifier 131.

The steam turbine 172 is disposed between the gasifier 131 and the condenser 74 and is configured such that steam flows into the steam turbine 172 from the boiler 171 via the gasifier 131 and steam discharged from the steam turbine 172 flows into the condenser 74.

A known configuration can be used for the steam turbine 172; the configuration thereof is not particularly limited.

Next, a power generation method used in the integrated coal gasification combined cycle facility 101, having the above-described configuration, will be described with reference to FIG. 2.

Coal supplied to the coal supplying unit is supplied to the slurry bed 12 together with water containing catalysts heated in the gas cleaning unit 141. At this time, the temperature of the water containing catalysts is lower than approximately 200° C., for example.

In the slurry bed 12, the supplied coal is pulverized to fine coal particles to generate slurry. The slurry generated by the slurry bed 12 contains approximately 90% water by weight and has a temperature from approximately 100° C. to approximately 200° C.

The slurry is supplied to the filtering unit 14, and the filtering unit 14 eliminates excess water and catalysts contained in the supplied slurry to produce a dehydrated cake. The dehydrated cake produced by the filtering unit 14 contains approximately 80% water by weight. On the other hand, the eliminated excess water and catalysts are supplied to the ash heat exchanger 16.

The dehydrated cake is supplied from the filtering unit 14 to the drying unit 15, is dried by drying air supplied through the drying flow path 121, and is supplied to the gasifier 131. The dried pulverized coal contains approximately 40% water by weight.

On the other hand, the drying air is introduced from the atmosphere, is heated to approximately 80° C. by the heat of steam in the condenser 74, and is then supplied to the drying unit 15. The drying air used to extract moisture from the dehydrated cake in the drying unit 15 is discharged to the outside.

Excess water and catalysts separated from the dehydrated cake in the drying unit 15 are supplied to the ash heat exchanger 16 together with the excess water and catalysts separated in the filtering unit 14.

The water containing catalysts supplied to the ash heat exchanger 16 is heated in the ash heat exchanger 16 by the heat of ash discharged from the gasifier 131.

The heated water containing catalysts absorbs heat from the produced gas in the gas cleaning unit 141, further increasing in temperature, and flows into the slurry bed 12 again.

The gasifier 131 is supplied with the pulverized coal from the drying unit 15 and is also supplied with part of exhaust gas that has been discharged from the gas turbine power generation section 104 and that has passed through the boiler 171, as a gasifying agent. Further, the gasifier 131 is supplied with steam from the boiler 171 via the combustor 162.

The gasifier 131 is pressurized at a predetermined pressure and is kept at a temperature from approximately 600° C. to approximately 700° C., for example.

In the gasifier 131, combustible gas is produced through a coal gasification reaction. The produced gas is supplied from the gasifier 131 to the gas cleaning unit 141. Since the coal contains catalysts, the coal gasification reaction proceeds to produce combustible gas even at a temperature from approximately 600° C. to approximately 700° C., for example.

The steam to be supplied to the gasifier 131 is heated while flowing from the boiler 171 toward the gasifier 131, by receiving the supply of combustion heat in the combustor 162. For example, steam having a temperature lower than approximately 450° C. when flowing out from the boiler 171 is heated, by receiving the combustion heat, to a temperature of approximately 700° C.

More preferably, the steam is heated to a temperature several tens of degrees Celsius higher than the gasification reaction temperature in the gasifier 131.

The steam supplied to the gasifier 131 releases part of its heat in the gasifier 131 and flows out toward the steam turbine 172. The steam that has just flowed out toward the steam turbine 172 has a temperature lower than approximately 550° C., for example.

On the other hand, after the coal discharges combustible produced gas, ash is generated and supplied to the ash heat exchanger 16. Note that a known reaction can be used as the coal gasification reaction; the coal gasification reaction is not particularly limited.

The produced gas produced by the gasifier 131 flows into the cleaning device 142 of the gas cleaning unit 141, where impurities are eliminated therefrom, and part of the heat of the produced gas is recovered by the water containing catalysts.

The temperature of the produced gas flowing out from the gasifier 131 is lower than approximately 500° C., for example, and is reduced to be lower than approximately 300° C., for example, by recovering part of the heat of the produced gas in the gas cleaning unit 141.

The combustor 162 is supplied with the produced gas from which impurities have been eliminated and air compressed by the compressor 61 and combusts the produced gas. The compressed air has a temperature lower than approximately 400° C., for example.

Part of the heat generated through combustion of the produced gas is used to heat the steam to be supplied to the gasifier 131 from the boiler 171, and the remaining heat flows into the turbine 63 together with combustor exhaust gas. In other words, combustor exhaust gas whose temperature has become high is supplied to the turbine 63. The temperature of the combustor exhaust gas is approximately 1,000° C. or higher, and more desirably falls within the range from 1,200° C. to 1,500° C., for example.

Since subsequent operations in the gas turbine power generation section 104 are the same as those in the first embodiment, a description thereof will be omitted.

Exhaust gas discharged from the gas turbine power generation section 104 is supplied to the boiler 171, and the boiler 171 supplies part of the heat of the exhaust gas flowing thereto to water supplied from the condenser 74, to generate steam. The steam generated in the boiler 171 is supplied to the gasifier 131 via the combustor 162 and is then supplied to the steam turbine 172.

The steam supplied to the steam turbine 172 rotationally drives the steam turbine 172, and the rotary driving force is used for power generation in the steam turbine generator 73.

The steam discharged from the steam turbine 172 flows into the condenser 74 and is condensed in the condenser 74.

According to the above-described configuration, since exhaust gas that has been discharged from the gas turbine power generation section 104 and that has been used to generate steam in the boiler 171 is used as a gasifying agent, it is unnecessary to provide, for example, a booster compressor for increasing the pressure of a gasifying agent, a large-scale oxygen generating apparatus for generating a gasifying agent, or the like.

Further, because the steam generated in the boiler 171 is guided to the gasifier 131, and the gasifier 131 is heated by the heat of the steam, it is unnecessary to separately supply fuel or energy in order to maintain the temperature of the gasifier 131, and thus, a reduction in power generation efficiency can be prevented.

The invention claimed is:
1. An integrated coal gasification combined cycle facility comprising:
a gasification section that gasifies supplied coal;

a gas power generation section that generates electric power by using gas supplied from the gasification section;

a steam power generation section that generates electric power by using heat of exhaust gas discharged from the gas power generation section; and a coal drying unit that dries the coal by using exhaust heat discharged from the steam power generation section and that supplies the coal dried, to the gasification section, wherein the steam power generation section comprises a condenser that recovers heat of steam discharged from the steam power generation section; and the coal drying unit dries the coal by using the heat of steam recovered by the condenser.

2. An integrated coal gasification combined cycle facility according to claim 1, wherein:

the steam power generation section comprises a steam turbine unit to which steam generated with the heat of exhaust gas discharged from the gas power generation section is supplied; and the gasification section is supplied with steam extracted from the steam turbine unit as a gasifying agent for the coal.

3. An integrated coal gasification combined cycle facility according to claim 2, wherein the gasification section is supplied with exhaust gas discharged from the gas power generation section as a heat source for heating.

4. An integrated coal gasification combined cycle facility according to claim 1, wherein:

the steam power generation section comprises a boiler that generates steam by using the heat of exhaust gas discharged from the gas power generation section; and the gasification section is supplied with exhaust gas discharged from the boiler as a gasifying agent for the coal.

5. An integrated coal gasification combined cycle facility according to claim 4, wherein the gasification section is supplied with the steam generated by the boiler as a gasifying agent for the coal.

6. An integrated coal gasification combined cycle facility according to claim 1, further comprising a cleaning unit including a cleaning device and a heat pipe, and provided between the gasification section and the gas power generation section, wherein the cleaning device cleans the gas supplied from the gasification section, and the heat pipe partly recovers heat of the gas supplied from the gasification section.

7. An integrated coal gasification combined cycle facility according to claim 6, further comprising a slurry bed and a filtering unit, the filtering unit being arranged between the coal drying unit and the slurry bed, wherein the slurry bed pulverizes the coal, and a filtering unit eliminates excess water and catalysts of the coal supplied through the slurry bed.

8. An integrated coal gasification combined cycle facility according to claim 7, further comprising a slurry heat exchanger arranged between the slurry bed and the filtering unit, wherein the cleaning unit further comprises a heat-pipe heat exchanger, the heat-pipe heat exchanger transfers the heat of the gas supplied from the gasification section partly recovered by the heat pipe to the slurry heat exchanger to heat the coal supplied through the slurry bed.

* * * * *